United States Patent
Buseth et al.

(10) Patent No.: US 7,232,544 B2
(45) Date of Patent: Jun. 19, 2007

(54) APPARATUS FOR CONTINUOUS SLAG TREATMENT OF SILICON

(75) Inventors: Torfinn Buseth, Seljeveien (NO); Kenneth Friestad, Radyveien (NO); Pal Runde, Radyrvein (NO)

(73) Assignee: Elkem AS, Oslo (NO)

( * ) Notice: Subject to any disclaimer, the term of this patent is extended or adjusted under 35 U.S.C. 154(b) by 482 days.

(21) Appl. No.: 10/492,220

(22) PCT Filed: Oct. 7, 2002

(86) PCT No.: PCT/NO02/00363

§ 371 (c)(1),
(2), (4) Date: Apr. 8, 2004

(87) PCT Pub. No.: WO03/031332

PCT Pub. Date: Apr. 17, 2003

(65) Prior Publication Data

US 2004/0258588 A1 Dec. 23, 2004

(30) Foreign Application Priority Data

Oct. 10, 2001 (NO) .................................. 20014922

(51) Int. Cl.
*C21C 5/42* (2006.01)
(52) U.S. Cl. .................... 266/236; 422/245.1; 266/148
(58) Field of Classification Search ................ 266/148, 266/200, 236; 422/245.1
See application file for complete search history.

(56) References Cited

U.S. PATENT DOCUMENTS

| 4,457,903 A | 7/1984 | Dietl et al. |
| 5,104,096 A * | 4/1992 | Goins et al. ................ 266/148 |
| 2004/0258588 A1 * | 12/2004 | Buseth et al. ............ 422/245.1 |

* cited by examiner

*Primary Examiner*—Scott Kastler
(74) *Attorney, Agent, or Firm*—Lucas & Mercanti, LLP

(57) ABSTRACT

The invention relates to an apparatus for continuous slag treatment of molten silicon for removal of one a more impurity elements from the silicon, the apparatus comprising a vessel (1) intended to contain molten silicon and liquid slag. The vessel (1) has an upwardly extending overflow (4) for slag connected to an outlet opening (3) for slag is the bottom (2) of the vessel, a open-ended pipe (5) arranged about and at a distance from the overflow (4) such than there is an annulus between the pipe (5) and the overflow (4), which pipe (5) extends upwards to a level above the top of the overflow (4) and downwards to the bottom (2) of the vessel, the pipe (5) having at least one opening (6) at the bottom of the vessel (1) a closeable outlet opening (8,9) for treated silicon in the sidewall of the vessel, means (14) for supply of heat energy to the vessel, means for intermittent supply of solid or molten silicon to vessel and means for continuous of substantially continuous supply of solid or liquid slag to the top of the vessel.

10 Claims, 2 Drawing Sheets

APPARATUS FOR CONTINUOUS SLAG TREATMENT OF SILICON

FIELD OF INVENTION

The present invention relates to an apparatus for continuous slag treatment of molten silicon.

BACKGROUND ART

From Norwegian patent No. 180532 it is known a method for removing impurities, particularly boron, from molten silicon by continuous treatment of the silicon with slag. According to Norwegian patent No. 180532 the slag is added continuously or substantially continuously to the molten silicon and the slag is inactivated or removed continuously or substantially continuously as soon as equilibrium is reached between the slag and the molten silicon with respect to the impurity element or elements which are to be removed.

If the slag has a higher density than molten silicon, it is proposed in Norwegian patent No. 180532 to supply the slag to the top of the silicon bath and continuously or substantially continuously withdraw the slag from the bottom of the vessel in which the treatment is carried out.

It has however been found that it is difficult to withdraw the slag continuously or substantially continuously from the bottom of the vessel without withdrawing a substantially amount of silicon together with the slag. Further is has been found that it is difficult to remove all slag from the silicon. The yield of silicon by use of the method disclosed in Norwegian patent No. 180532 will for these reasons be low and the refined silicon can be contaminated with some slag particles.

DISCLOSURE OF INVENTION

By the present invention an apparatus has been provided where slag can be withdrawn continuously without any silicon following the slag and where it can be obtained a refined silicon having a very low slag content.

The present invention thus relates to an apparatus for continuous slag treatment of molten silicon for removal of one a more impurity elements from the silicon, the apparatus comprising a vessel intended to contain molten silicon and liquid slag, the vessel having an upwardly extending overflow for slag connected to an outlet opening for slag is the bottom of the vessel, a open-ended pipe arranged about and at a distance from the overflow such than there is an annulus between the pipe and the overflow, which pipe extends upwards to a level above the top of the overflow and downwards to the bottom of the vessel, the pipe having a least one opening at the bottom of the vessel, a closeable outlet opening for treated silicon in the sidewall of the vessel, means for supply of heat energy to the vessel, means for intermittent supply of solid or molten silicon to vessel and means for continuous or substantially continuous supply of solid or liquid slag to the top of the vessel.

The vessel preferably has a circular cross-section, but may also have an oval, square or rectangular cross-section.

The overflow is preferably cylindrical, but can also have oval, square or rectangular cross-section.

The vessel preferably has a gas tight sealed lid having openings for supply of silicon and slag. The gas tight lid makes it possible to control the atmosphere above the molten bath in the vessel.

The means for supply of heat energy to the vessel is preferably an induction heating device or a resistance heating device arranged on the outside of the vessel. However, the means for supply of heat energy can also be a plasma burner or electrodes arranged in the vessel.

It has been found that by the use of the apparatus according to the present inventions where slag is removed by overflow, a very good removal of slag from the silicon is obtained and thereby a higher yield of silicon is obtained. Further, silicon which is tapped from the vessel after the slag treatment will not contain slag particles as the outlet opening for the treated silicon is arranged above the level of slag in the vessel. The use of the apparatus according to the invention further gives an increased control of the volume flows in the vessel as it can be controlled that the amount of slag supplied to the vessel is equal to the slag tapped from the vessel via the overflow.

SHORT DESCRIPTION OF DRAWINGS

DETAILED DESCRIPTION OF THE INVENTION

Figure 1:
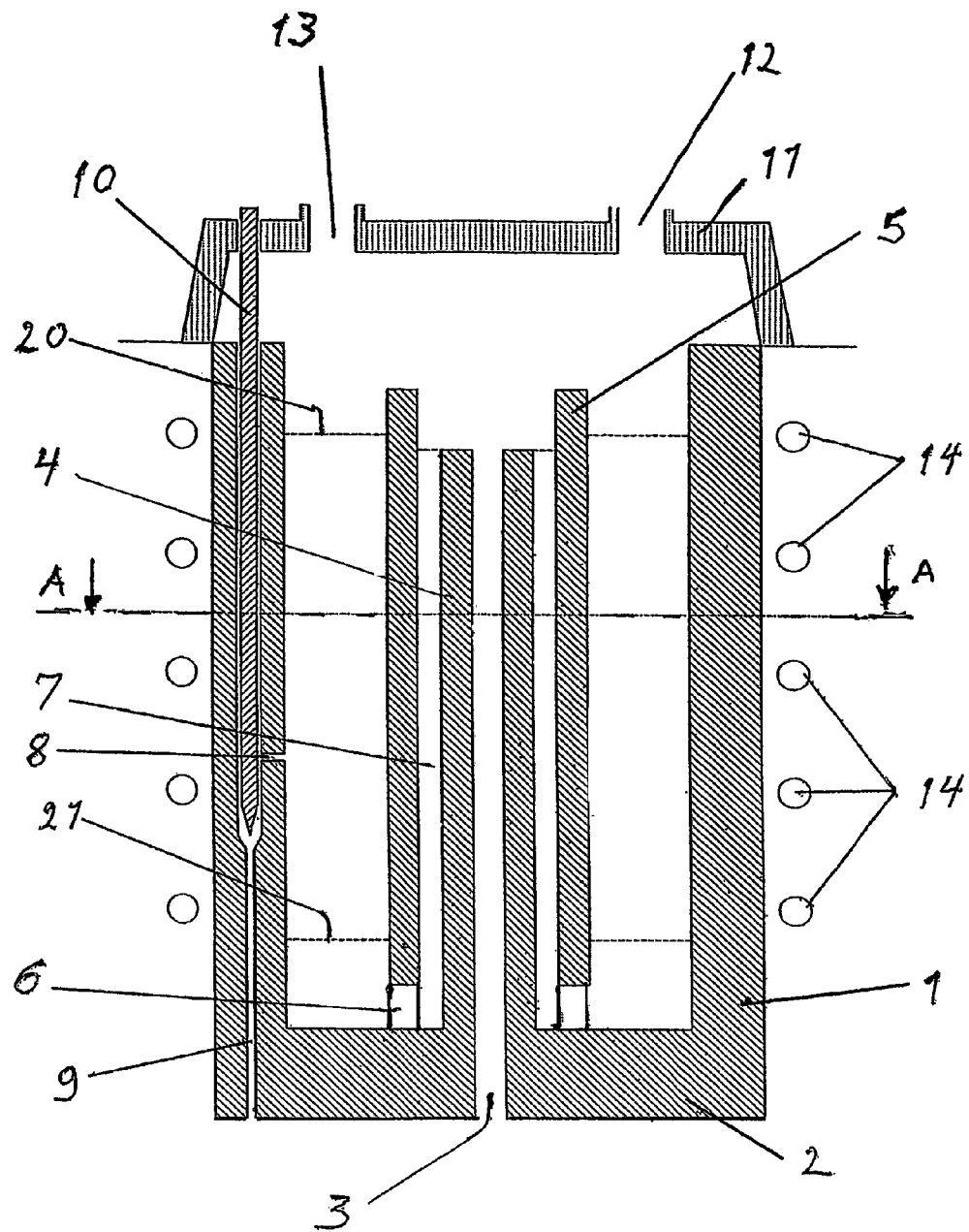
FIG. 1 is a vertical cut through the apparatus according to the invention.
Figure 2:
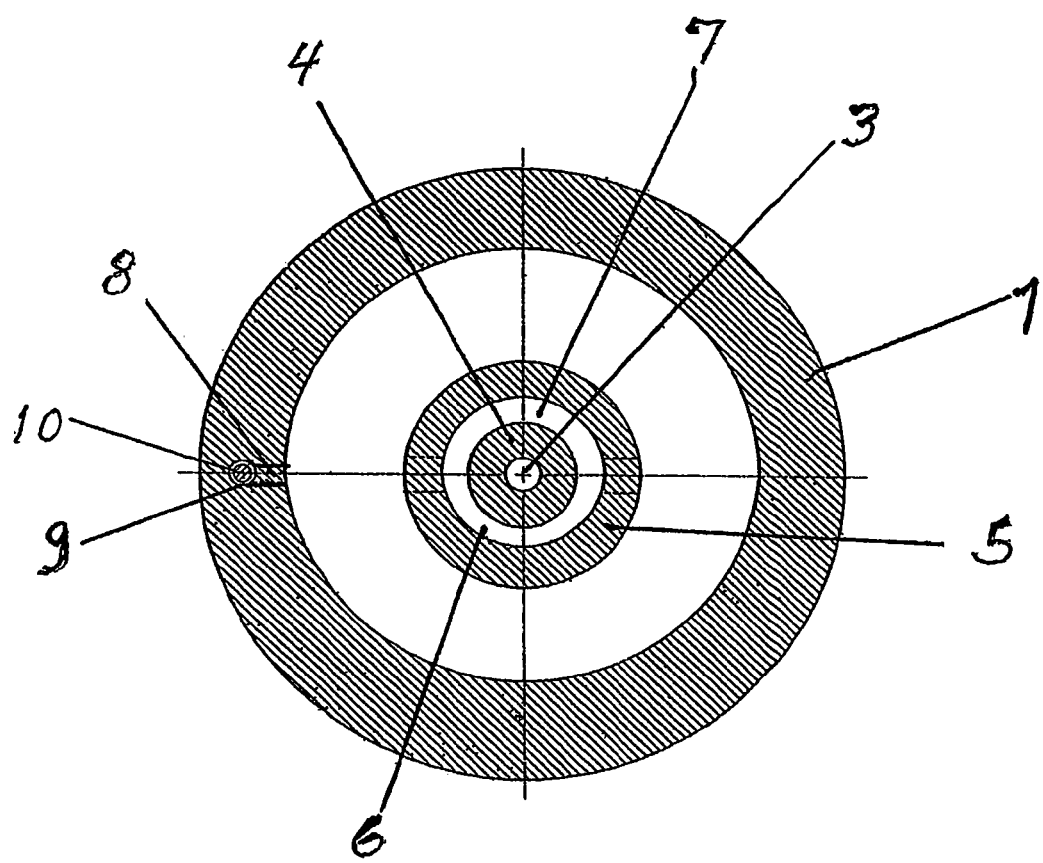
FIG. 2 is a horizontal cut taken along line A—A in FIG. 1.

On FIGS. 1 and 2 it is shown a cylinder-shaped vessel 1. The vessel 1 is made from graphite. The vessel 1 has an outlet opening 3 for slag in the bottom 2. The outlet opening 3 communicates with an overflow 4 which extends from the bottom 2 of the vessel 1 and upwardly in the vessel 1. In the embodiment shown in the Figures the overflow 4 has a circular cross-section, but an overflow having other cross-sections such as oval, square or rectangular cross-sections can also be used. About the overflow 4 it is arranged an open-ended pipe 5 extending from the bottom 2 of the vessel 1 and upwardly to a level above the upper end of the overflow 4. The pipe 5 shown in FIGS. 1 and 2 has a circular cross-section, but may have other cross-sections such as oval, rectangular or square. At the bottom of the vessel 1 the pipe 5 has openings 6 allowing slag to flow from the space between the inside of the vessel 1 and the outside of the pipe 5 and into the annulus 7 between the inside of the pipe 5 and the outside of the overflow 4. The openings 6 may be horizontal of they can be inclined towards the horizontal. In the sidewall of the vessel 1 at a level above the bottom 2 of the vessel 1, there is arranged a closeable opening 8 for tapping of treated silicon, which opening 8 communicates with a tapping channel 9 arranged in the sidewall of the vessel 1. The opening 8 can be opened and closed by means of a vertically arranged stopper rod 10. For opening of the opening 8 the stopper rod 10 is moved upwardly and for closing of the opening 8 the stopper rod 10 is moved downwardly.

The vessel 1 has a gas tight lid 11 with openings 12, 13 for supply of silicon to be treated and for continuous supply of solid or liquid slag.

Heat energy is supplied to the apparatus shown in FIGS. 1 and 2 by means of an induction heating means 14. Alternatively the supply of heat energy can be done by means of electric heating elements arranged about the circumference of the vessel 1.

Both the overflow 4 and the pipe 5 are made from a material which is resistant against liquid slag and molten silicon. Preferably all the parts of the apparatus are made from graphite, but other materials such as silicon carbide, silicon nitride, silicon oxynitride or graphite having a layer of silicon carbide, silicon nitride or silicon oxynitride can also be used.

Even if the embodiment in the Figures shows a cylinder-shaped vessel 1, it is within the scope of the invention to use a vessel 1 having other cross-sections such s oval, rectangular or square cross-section.

By use of the apparatus according to the present invention, solid a molten silicon to be treated is supplied to the vessel 1 in the space between the inside of the vessel 1 and the outside of the pipe 5 and the vessel 1 with its content is heated to a temperature above the melting point of silicon by means of the induction heating means 14. Thereafter slag, preferably in liquid form, is continuously or substantially continuously supplied to the vessel 1 through the openings 12 and 13 in the lid 11. The slag supplied has a higher density then the molten silicon.

The slag will when supplied, sink down through the bath of molten silicon and contaminating elements in the silicon will be transferred to the slag. Since the slag has a higher density than the silicon, the slag will gradually form a slag layer on the bottom of the vessel 1 and flow through the openings 6 in the pipe 5 and into the annulus between the outside of the overflow 4 and the inside of the pipe 5. When a sufficient amount of slag has been supplied a stationary situation will be reached. When a further amount of slag is supplied, an equal amount of slag will flow into the overflow 4 and out through the outlet opening 3 for slag. This situation is indicated in FIG. 1 where the top of the silicon bath is indicated by reference numeral 20 and where the bottom of the silicon bath is indicated by reference numeral 21, while the slag that has sunk through the silicon bath is below the silicon bath and fills the annulus between the overflow 4 and the pipe 5. Slag will thus be continuously supplied and continuously removed.

When the molten silicon bath has obtained a sufficient purity, the supply of slag is stopped, and when all slag has sunk through the silicon bath, the outlet opening 8 is opened by lifting the stopper rod 10. The part of the silicon bath situated above the outlet opening 8 will then flow out of the vessel 1 through the channel 9 and is collected in a ladle (not shown) under the channel 9. Thereafter the outlet opening 8 is closed by moving the stopper rod 10 downwardly. A new batch of silicon is then supplied to the vessel 1 and the continuous supply of slag is again started.

By arranging the outlet opening 8 a distance above the upper level of the slag layer, slag particles in the silicon tapped from the vessel 1 is prevented.

The invention claimed is:

1. In an apparatus for continuous slag treatment of molten silicon for removal of one a more impurity elements from the silicon, the apparatus comprising a vessel intended to contain molten silicon and liquid slag the vessel has an upwardly extending overflow for slag connected to an outlet opening for slag is the bottom of the vessel, and means for supplying heat energy to the vessel, the improvement comprising: an open-ended pipe arranged about and at a distance from the overflow such that there is an annulus between the pipe and the overflow, which pipe extends upwards to a level above the top of the overflow and downwards to the bottom of the vessel, the pipe having at least one opening at the bottom of the vessel, a closeable outlet opening for treated silicon in the sidewall of the vessel, and means for intermittent supplying solid or molten silicon to the vessel and means for continuous or substantially continuous supplying solid or liquid slag to the top of the vessel.

2. The apparatus according to claim 1, wherein the vessel has a circular, oval, square or rectangular cross-section.

3. The apparatus according to claim 1, wherein the overflow has a circular, oval, square or rectangular cross-section.

4. The apparatus according to claim 1 wherein the pipe has a circular, oval, rectangular or square cross-section.

5. The apparatus according to claim 1 wherein the vessel, the overflow and the pipe are made from graphite.

6. The apparatus according to claim 1 wherein the vessel, the overflow and the pipe are made from graphite having a surface layer of silicon carbide, silicon nitride or silicon oxynitride.

7. The apparatus according to claim 1 wherein the vessel, the overflow and the pipe are made from silicon carbide, silicon nitride or silicon oxynitride.

8. The apparatus according to claim 1, wherein the vessel has a gas tight lid with openings for supply of silicon and slag.

9. The apparatus according to claim 1, wherein the means for supplying heat energy is an induction heating means arranged on the outside of the vessel.

10. The apparatus according to claim 1, wherein the means for supplying heat energy is a resistance heating means arranged on the outside of the vessel.

* * * * *